US012159518B1

(12) United States Patent
Kelsch et al.

(10) Patent No.: US 12,159,518 B1
(45) Date of Patent: *Dec. 3, 2024

(54) UNIVERSAL SECURITY APPARATUS FOR WEARABLE ELECTRONIC DEVICES

(71) Applicant: Christopher A. Kelsch, Palm Harbor, FL (US)

(72) Inventors: Christopher A. Kelsch, Palm Harbor, FL (US); Lee Eckert, Sarasota, FL (US); Robert Ekle, Land O' Lakes, FL (US); Sarah Johnson, Tampa, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,020

(22) Filed: Oct. 9, 2023

Related U.S. Application Data

(63) Continuation of application No. 17/490,087, filed on Sep. 30, 2021, now Pat. No. 11,804,115.

(51) Int. Cl.
*G08B 13/14* (2006.01)
*H02J 50/10* (2016.01)

(52) U.S. Cl.
CPC .......... *G08B 13/1418* (2013.01); *H02J 50/10* (2016.02)

(58) Field of Classification Search
CPC ............ G08B 13/1418; G08B 13/1463; G08B 13/1445; G08B 13/149; A47F 7/024; E05B 73/0082; H02J 50/10
See application file for complete search history.

(56) References Cited

U.S. PATENT DOCUMENTS

| | | | |
|---|---|---|---|
| 11,178,983 B1* | 11/2021 | Kelsch | A47F 7/024 |
| 11,804,115 B1* | 10/2023 | Kelsch | G08B 13/1418 |
| 2017/0046931 A1* | 2/2017 | Hartweg | A47F 7/022 |
| 2021/0244940 A1* | 8/2021 | Liberatore | A61N 1/3603 |
| 2022/0408943 A1* | 12/2022 | Kumka | F16M 13/02 |

* cited by examiner

*Primary Examiner* — Adnan Aziz
(74) *Attorney, Agent, or Firm* — Andriy Lytvyn; Hill Ward Henderson, P.A.

(57) ABSTRACT

An anti-theft device for securing a wearable electronic against unauthorized removal from a display counter. The anti-theft device has a stand configured to be attached to a display surface. A shelf configured to support the wearable electronic is affixed to the stand. The shelf of the anti-theft device has a recess configured to receive interchangeable inserts. Each insert has a first surface sized for insertion into the recess and a second surface configured to couple to a charger. Each insert also has a notch, which is configured to be at least partially aligned with an aperture of the recess. A charger is coupled to the insert, and an electrical cable connected to the charger is routed through the notch and the aperture. The charger supplies power to the wearable electronic when it is positioned on the shelf of the anti-theft device.

20 Claims, 7 Drawing Sheets

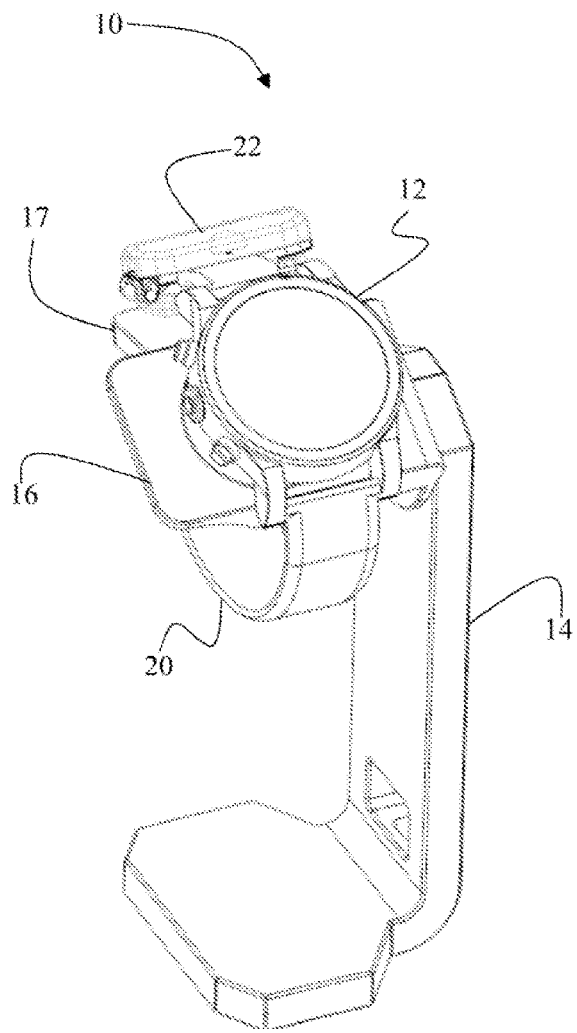
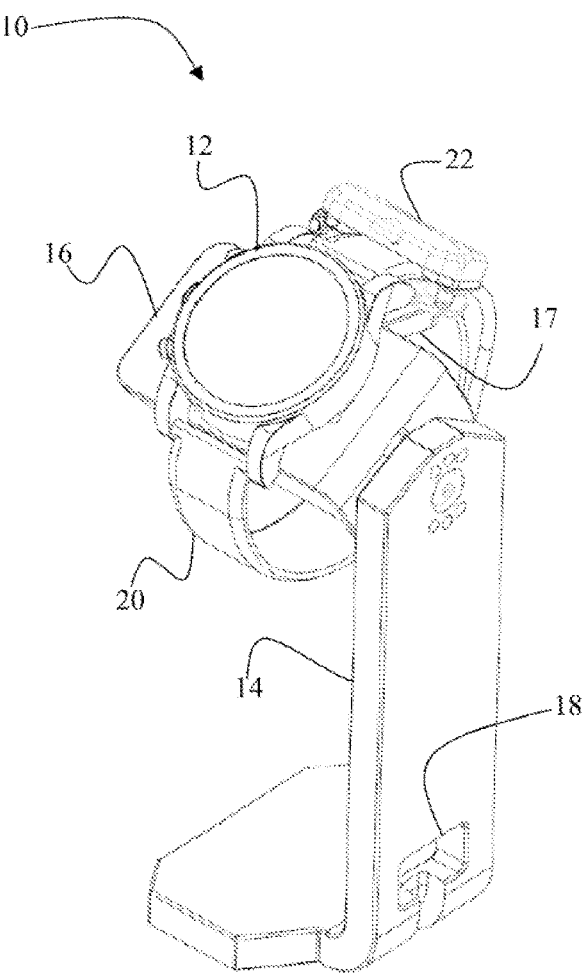
FIG. 1A
FIG. 1B

UNIVERSAL SECURITY APPARATUS FOR WEARABLE ELECTRONIC DEVICES

PRIORITY CLAIM

This non-provisional patent application is a continuation of and claims priority to U.S. patent application Ser. No. 17/490,087 filed on Sep. 30, 2021.

BACKGROUND OF THE INVENTION

1. Field of the Invention

This invention relates to merchandise anti-theft devices. More specifically, it relates to a security stand for displaying wearable electronics and having interchangeable inserts for accommodating their dedicated chargers.

2. Brief Description of the Related Art

Retailers often prefer to present their merchandise to consumers in a way that allows the consumers to touch, inspect, and otherwise interact with the products at a display counter. Many merchandise items, especially portable electronic devices, are relatively expensive and, therefore, are under a serious threat of theft. Retailers often face a dilemma of balancing a need to interactively display their merchandise to attract customers to increase sales with a need to safeguard the merchandise against theft.

Wearable electronics—such as smartwatches and fitness trackers—are at a high risk of theft because they are expensive and are in high demand. Wearable electronics are also difficult to secure at the point of display due to significant variations in their shapes and sizes. Furthermore, most manufactures of wearable electronics—for example, APPLE and SAMSUNG—use proprietary wireless charging pucks that couple to the rear surface of the wearable electronic to charge its battery. These proprietary charging pucks have different thicknesses and diameters. Furthermore, some wearable electronics have non-inductive chargers that require direct contact between the charger and the wearable electronic device. Because there is a strong need to present the wearable electronics in a powered-on state to enable consumer interaction, the security devices for displaying wearable electronics must be designed to accommodate their corresponding proprietary chargers.

Currently, anti-theft devices for securing wearable electronics are generally designed to fit the geometry of a specific model of wearable electronic and its dedicated inductive or non-inductive charger. Therefore, when a retailer decides to change the model or type of wearable electronics presented on the display counter, the retailer must replace the security stands with those designed specifically to accommodate the corresponding chargers. Considering the high pace of the wearable electronics market, lack of versatility of the anti-theft devices for wearable electronics constitutes a major inefficiency and may significantly delay a retailer's ability to securely display new models of wearable electronics.

Thus, what is needed is a universal security stand for wearable electronics that can be readily reconfigured to accommodate a variety of models of wearable electronics and their corresponding proprietary chargers.

SUMMARY OF THE INVENTION

The problem stated above is now resolved by a novel and non-obvious anti-theft device for securing an article of merchandise. In an embodiment, the anti-theft device has a stand configured to be attached to a display surface. The anti-theft device further includes a shelf affixed to the stand. The shelf is configured to support the article of merchandise.

The shelf of the anti-theft device has a recess that is open to the top surface of the shelf. The recess has an aperture configured to permit passage of an electric cable therethrough. In an embodiment, the recess has a lateral wall and a bottom, and the aperture is partially disposed on the lateral wall and partially disposed on the bottom. Furthermore, the aperture may be partially disposed on the shelf itself, outside of the recess.

The anti-theft device includes interchangeable inserts that are configured to be placed into the recess of the shelf. Each insert has a first surface sized for insertion into the recess and a second surface configured to couple to a charger. The charger may be inductive, in which case the charger supplies power to the article of merchandise wirelessly. Alternatively, the charger may be non-inductive configured to supply power to the article of merchandise via electrical conductors—for example, a pogo pin connector.

Each insert may have a notch, which is configured to be at least partially aligned with the aperture of the recess. When aligned, the aperture of the recess and the notch of the insert are configured to accommodate the electric cable electrically coupled to the charger. The insert may have one or more fingers configured to align the insert relative to the recess.

After the charger is coupled to the insert, the article of merchandise can be placed onto the shelf. The back surface of the anti-theft device is positioned over the recess, which houses the insert and the charger. In this manner, the charger can supply power to the article of merchandise when the article of merchandise is positioned on the shelf of the anti-theft device.

In an embodiment of the invention, the bottom of the recess may have a second aperture. The second aperture provides access to the interior space of the recess, such that a tool can be inserted through the second aperture to exert a force onto the insert positioned within the recess. In this manner, the insert can be removed from the recess.

In an embodiment, the anti-theft device has a security clip configured to attach to the article of merchandise. The security clip can be electrically coupled to an alarm circuitry via an electric conductor. The alarm circuitry can be configured to detect disengagement of the security clip from the article of merchandise or severance of the electric conductor.

Another function of the security clip is that it serves to properly align the article of merchandise relative to the anti-theft device. Specifically, the security clip and a magnetic or mechanical coupling between the charger and the article of merchandise establish two points of engagement between the anti-theft device and the article of merchandise—these two points of engagement maintain the article of merchandise aligned relative to the shelf. To achieve this functionality, the security clip may have an integrated magnet or magnetically attractable material that magnetically couples to a magnet or magnetically attractable material in the angled rear portion of the shelf. The magnetic or mechanical engagement between the article of merchandise and its charger creates the first point of engagement, and a second point of engagement is created between the security clip and the magnetic platform of the shelf. These two points of engagement maintain the article of merchandise aligned relative to the shelf.

In an embodiment, the stand of the anti-theft device may have a hollow channel configured to receive the electric cable supplying power to the inductive charger.

The invention also includes a method of securing an article of merchandise using the anti-theft device described herein. This method involves the steps of attaching a stand to a display surface and affixing a shelf to the stand. The shelf is configured to support the article of merchandise thereon. Next, an appropriate insert is placed into a recess disposed within the shelf such that a notch of the insert is at least partially aligned with an aperture of the recess. The charger is then coupled to the insert. An electric cable electrically coupled to the charger is routed through the notch of the insert and the aperture of the recess. The article of merchandise can be placed on the shelf such that a back surface of the article of merchandise is positioned over the charger. In this manner, the charger is configured to supply power to the article of merchandise when the article of merchandise is positioned on the shelf of the anti-theft device. A security clip can be attached to the article of merchandise.

DESCRIPTION OF THE DRAWINGS

For a fuller understanding of the invention, reference should be made to the following detailed description, taken in connection with the accompanying drawings, in which:

FIG. 1A is a left perspective view of the anti-theft device according to an embodiment of the invention.

FIG. 1B is a right perspective view of the anti-theft device according to an embodiment of the invention.

DETAILED DESCRIPTION OF THE PREFERRED EMBODIMENT

Figure 2A:
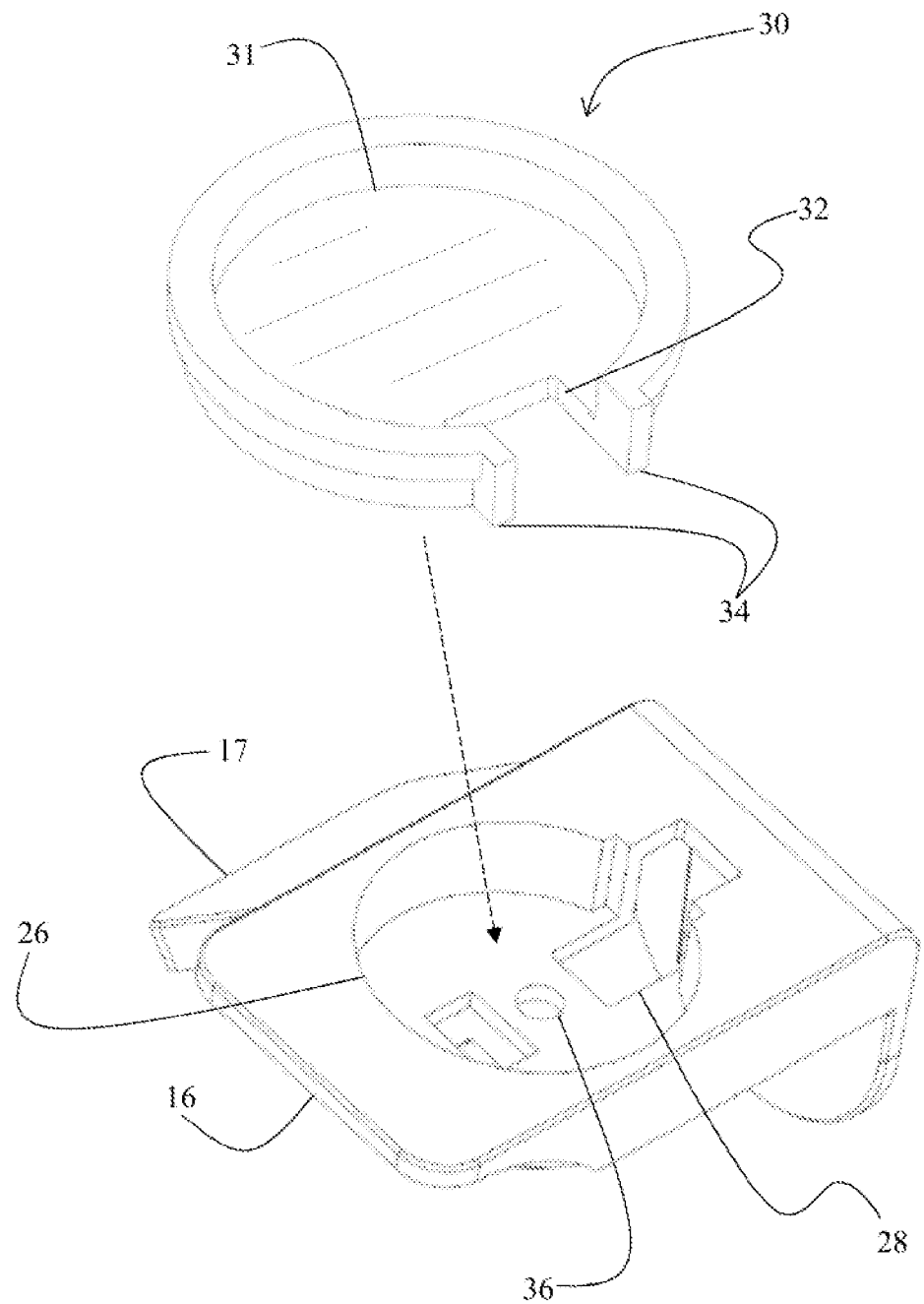
FIG. 2A is a perspective view of the first insert configured for insertion into a recess of the shelf of the anti-theft device.

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

FIGS. 1A and 1B depict perspective views of an anti-theft device 10 configured to secure an article of merchandise 12—for example a wearable electronic, such as a smartwatch. Anti-theft device 12 has a stand 14, which is configured to be mounted onto a display surface, such as a display counter in a retail store. A shelf 16 is attached to stand 14 using any mounting means known in the art, for example using a threaded mounting member such as a screw or a bolt. FIGS. 1A and 1B depict article of merchandise 12 positioned on shelf 16 in a manner that invites consumer inspection and interaction.

FIGS. 1A and 1B further depict that article of merchandise 12 has a wristband 20. In an embodiment, anti-theft device 10 comprises a security clip 22 configured to couple to wristband 20. Security clip 22 may be attached to stand 14 or to the display surface using a tether cable 24. Security clip 22 may be used to detect security events, such as disengagement of security clip 22 from wristband 20, disconnection of tether cable 24 from security clip 22 or stand 14, and/or severance of tether cable 24. A person of ordinary skill in the art will appreciate that there are a number of known mechanisms that can be used to achieve the security functions of security clip 22 described above. Upon detection of a security event, security clip 22 may be configured to trigger an internal alarm and/or transmit a signal to an external alarm module configured to trigger an alarm.

FIGS. 1A and 1B further depict that shelf 16 may have a platform 17. Platform 17 may be positioned at the rear of shelf 16 and may be angled to accommodate the curvature of wristband 20. In an embodiment, platform 17 and security clip 22 can comprise a magnet or magnetically attractable material to enable magnetic coupling between security clip 22 and platform 17. As will be described in more detail below, when article of merchandise 12 is secured by anti-theft device 10, the rear surface of article of merchandise 12 is magnetically or mechanically coupled to a charger affixed to shelf 16. The magnetic or mechanical engagement between article of merchandise 12 and its charger creates the first point of engagement, and, optionally, a second point of engagement is created between security clip 22 and platform 17. These two points of engagement maintain article of merchandise 12 aligned relative to shelf 16.

Figure 2B:
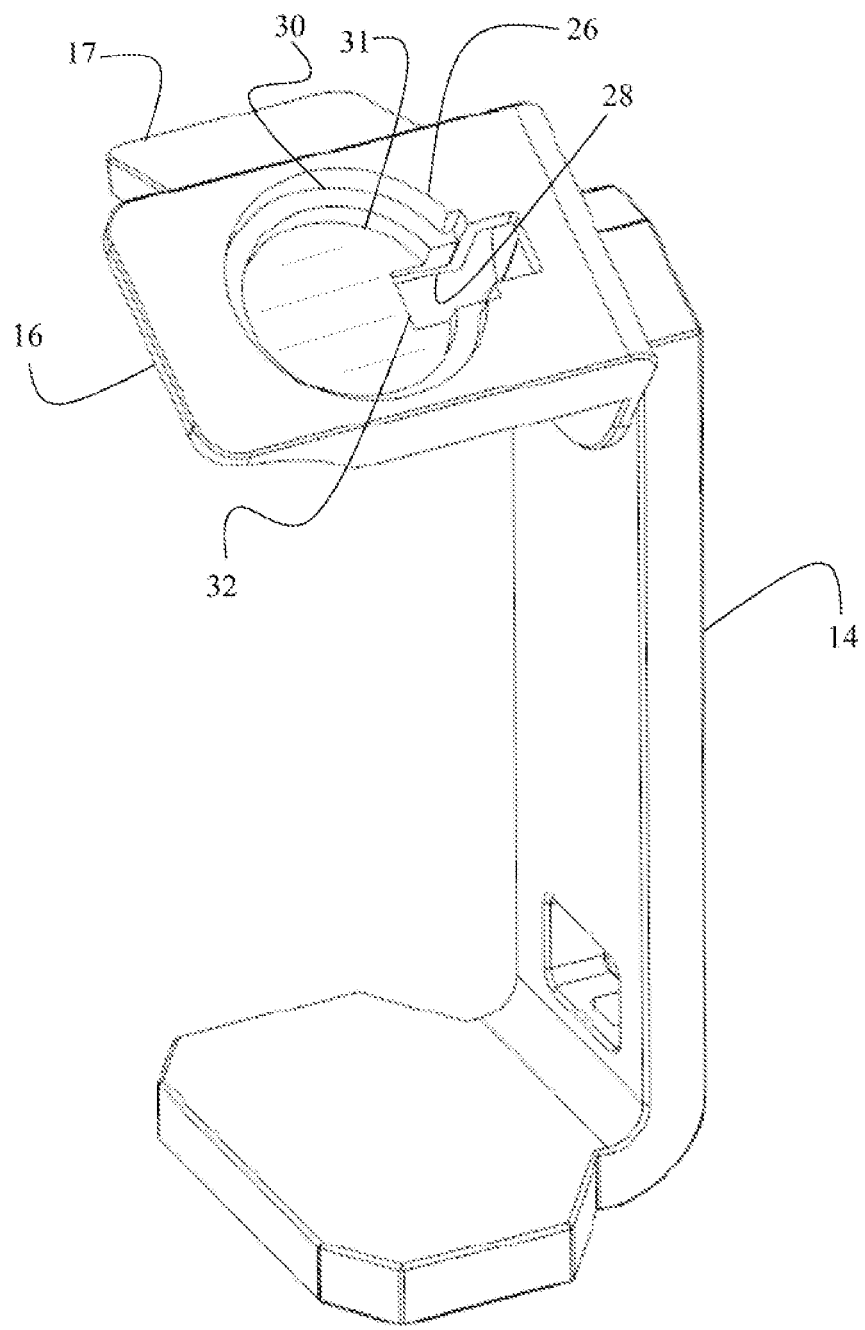
FIG. 2B is a perspective view of the anti-theft device depicting the first insert positioned within the recess of the shelf.

FIGS. 2A and 2B depict perspective views of anti-theft device 10 when article of merchandise 12 is not positioned thereon. FIGS. 2A and 2B reveal that shelf 16 has a recess 26. Recess 26 is configured to house a dedicated charger for supplying power to article of merchandise 12. The charger may be an inductive charger configured to wirelessly supply power to article of merchandise 12 or a non-inductive charger configured to supply power to article of merchandise 12 via electrical contacts.

An electrical cable can be coupled to the charger to supply power thereto. For this reason, FIGS. 2A and 2B depict that recess 26 has a first aperture 28, which is sized to permit the plug of an electrical cable—for example, a universal serial bus (USB) male plug—to pass therethrough. In an embodiment, aperture 28 may span from bottom of recess 26, through lateral wall of recess 26, and shelf 16. In other embodiment, aperture 28 may be any kind of opening, slot, or a notch configured to permit passage of an electrical cable connected to the charger.

FIGS. 2A and 2B further show that stand 14 can have a hollow channel 18 configured to accommodate the electrical cable. In this manner, the electrical cable coupled to the charger positioned within recess 26 can be routed through hollow channel 18 and concealed within stand 14. Thus, anti-theft device 10 can be used to display article of merchandise 12 neatly, without exposed electrical cables.

FIG. 2A depicts an insert 30. The exterior surface of insert 30 is sized such that insert 30 can be inserted into recess 26. Insert 30 has a cavity 31 configured to receive a differently shaped charger than the one configured for insertion directly into recess 26. In this manner, insert 30 alters the shape of the interior cavity of recess 26, adapting this cavity for receipt of a differently shaped charger. In the embodiment depicted in FIGS. 1A and 1B, recess 26 is originally shaped to accommodate a charger having a large diameter and/or thickness. FIGS. 2A and 2B depict, that when insert 30 is placed inside recess 26, recess 26 becomes reconfigured for accommodating a charger having a smaller diameter and/or thickness. Accordingly, a retailer can readily reconfigure anti-theft device 10 for display of a desired article of merchandise 12 and its dedicated charger by simply positioning insert 30 designed for that charger inside recess 26. This adaptive reconfigurability offers a major advantage by enabling retailers to quickly and efficiently change their displayed inventory, without sacrificing security.

FIG. 2A further depicts that insert 30 has a notch 32. The shape of notch 32 can be complementary to the shape of aperture 28 within recess 26. When insert 30 is placed into recess 26, notch 32 is at least partially aligned with aperture 28, such that the plug of the electric cable can pass through both notch 32 and aperture 28. To ensure that insert 30 is properly aligned with recess 26, insert 30 may be equipped with one or more fingers 34 configured to be received into corresponding grooves within recess 26.

FIG. 2A also depicts that a second aperture 36 may disposed on the bottom of recess 26. A tool may be inserted into recess 26 via second aperture 36 to exert a force onto insert 30 positioned therein, thus enabling removal of insert 30 from recess 26.

Figure 3A:
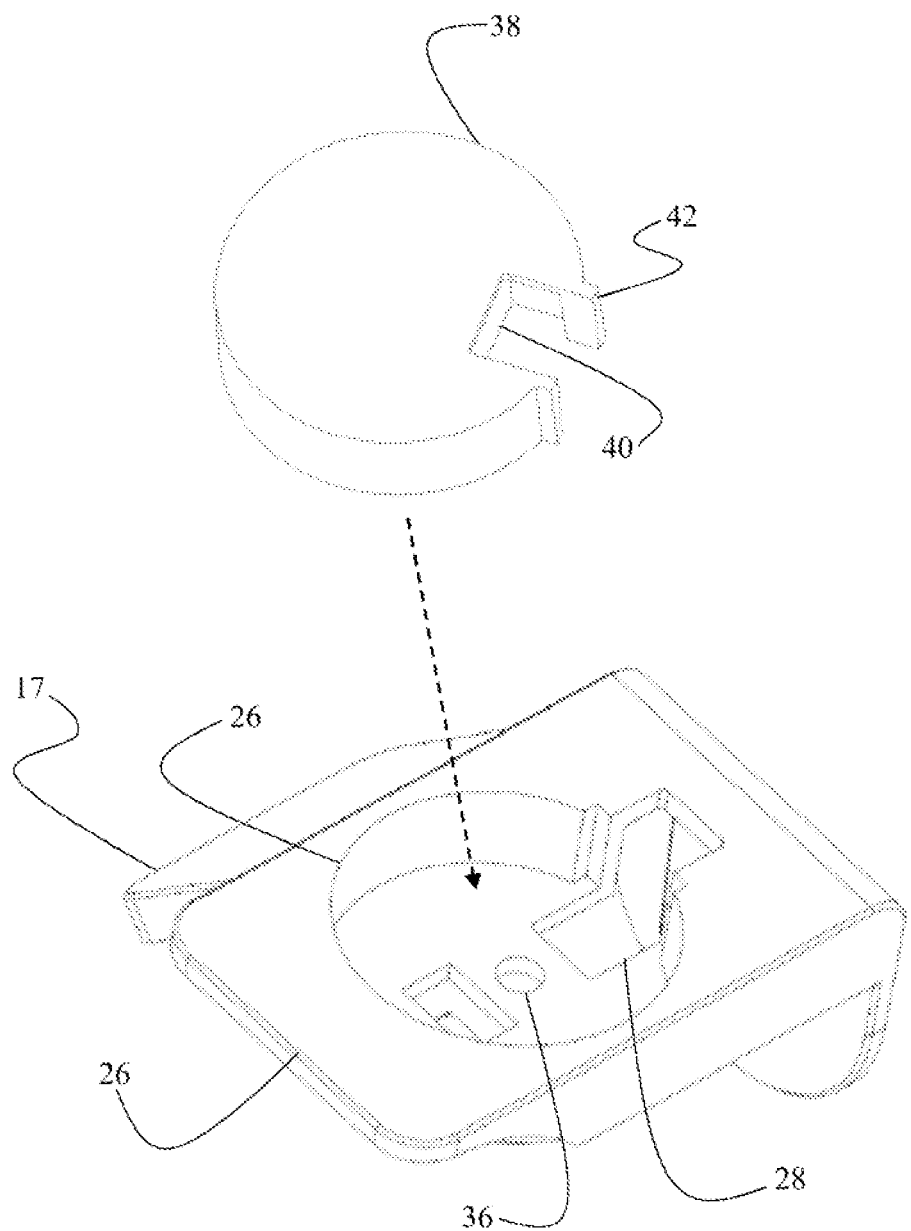
FIG. 3A is a perspective view of the second insert configured for insertion into a recess of the shelf of the anti-theft device.
Figure 3B:
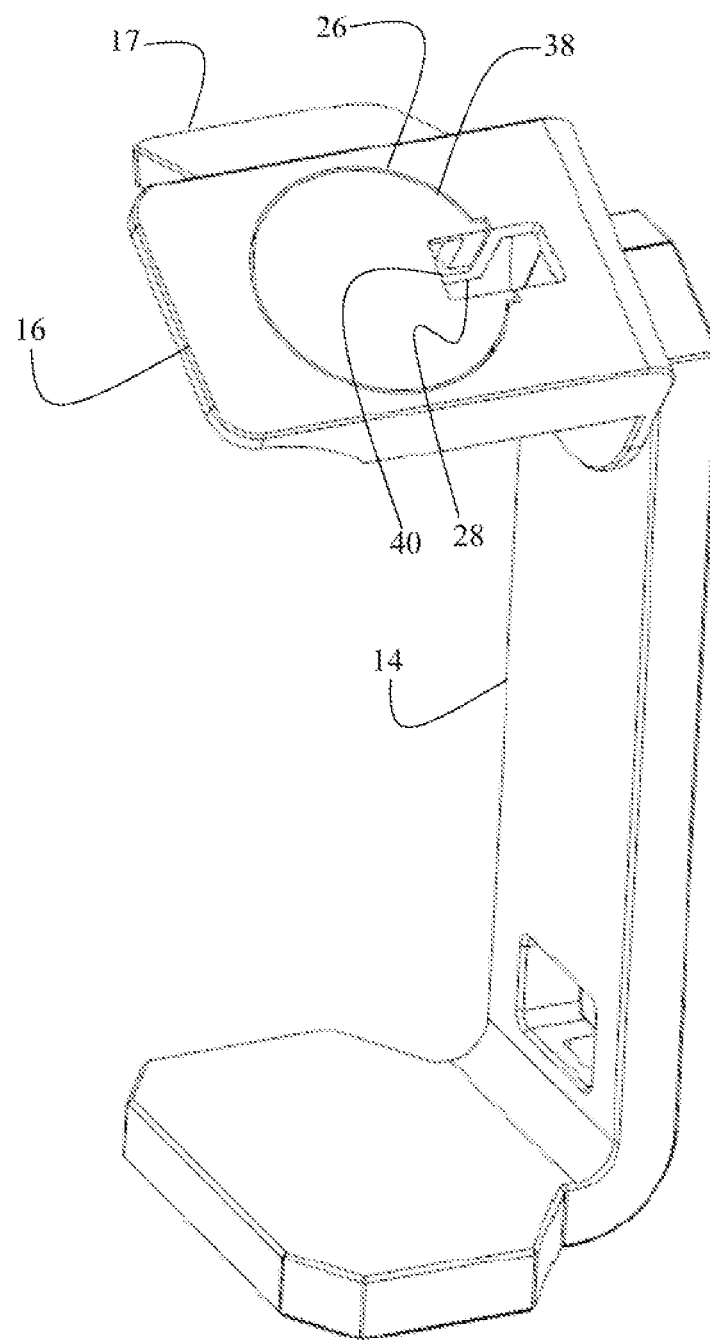
FIG. 3B is a perspective view of the anti-theft device depicting the second insert positioned within the recess of the shelf.

FIGS. 3A and 3B depict a second insert 38, which is shaped differently than insert 30. The exterior surface of insert 38 is configured for insertion into recess 26. However, as shown in FIGS. 3A and 3B, instead of cavity 31, second insert 38 has a flat top surface configured to be flush with the surface of shelf 16. In this manner, second insert 38 creates a flat surface on top of shelf 16. This flat surface can universally accommodate a charger of any dimensions because the charger can be affixed to the flat surface of shelf 16, without constraints of recess 26. Analogously to insert 30, insert 38 has a notch 40, which is configured to be aligned with aperture 28 of recess 26 to permit passage of an electrical cable/plug. Insert 38 further includes fingers 42 configured to facilitate and retain proper alignment between insert 38 and recess 26.

Insert 38 reconfigures anti-theft device 10 by effectively eliminating recess 26, thus adapting shelf 16 for display of article of merchandise 12 that uses a charger having a diameter larger than the diameter of recess 26. Furthermore, insert 38 can also be used to adapt shelf 16 to display article of merchandise 12 that does not use a charger and, instead, is directly coupled to an electrical cable. Other types of inserts can be readily designed and manufactured to accommodate the shape of the exact charger being used with a particular article of merchandise 12.

Figure 4:
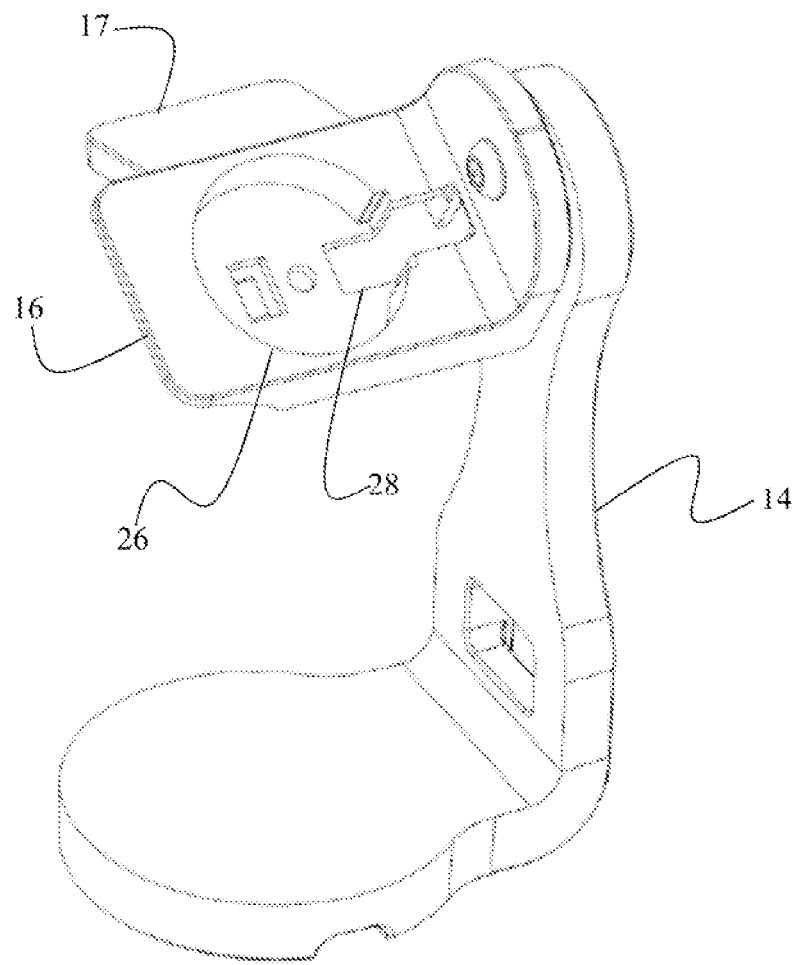
FIG. 4 is a perspective view of an embodiment of the invention using an inverted shelf.

FIG. 4 depicts an alternative embodiment of anti-theft device 10, in which shelf 16 has an inverted configuration. Same principles and structural features of the invention disclosed above also apply to this embodiment.

Figure 5:
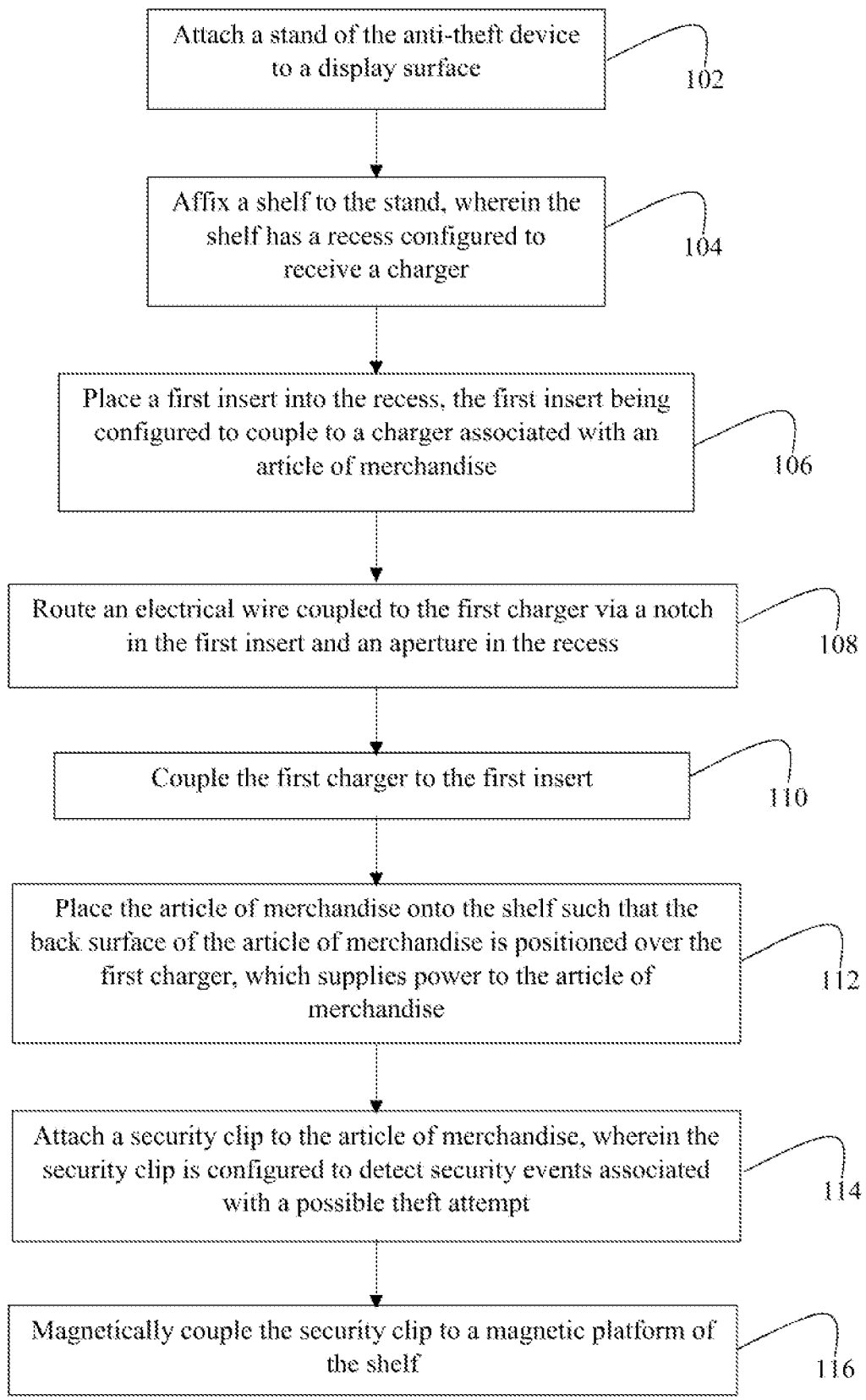
FIG. 5 is a flowchart schematically depicting the steps of securing the article of merchandise using the anti-theft device.

FIG. 5 is a flowchart depicting the steps of a method of securing article of merchandise 12 using anti-theft device 10. In step 102, an authorized individual attaches stand 14 to a display surface. In step 104, shelf 16 is affixed to stand 14. In step 106, insert 30—which has a cavity 31 sized to accommodate the appropriate charger associated with article of merchandise 12—is placed into recess 26, such that notch 32 is at least partially aligned with aperture 28. In step 108, the electrical cable for connecting the charger to a power source is routed through notch 32 and aperture 28. Next in step 110, the charger is coupled to insert 30. At this point anti-theft device 10 is ready to display article of merchandise 12.

In step 112, article of merchandise 12 is placed on shelf 16, with a back surface of article of merchandise 12 being positioned over the charger coupled to cavity 31 of insert 30. The charger may be configured to magnetically or mechanically couple to article of merchandise 12, thus securing it to shelf 16. The charger is configured to supply power to article of merchandise 12.

In the embodiments of anti-theft device 10 that utilize security clip 22, security clip 22 is attached to article of merchandise 12 in step 114. In step 116, security clip 22 is magnetically coupled to platform 17 of shelf 16. The magnetic coupling between the charger and article of merchandise 12 creates a first point of engagement therebetween. The magnetic coupling between platform 17 and security clip 22 (which secures wristband 20 of article of merchandise 12) creates a second point of engagement. In this manner, these two points of engagement ensure that article of merchandise 12 is properly aligned with respect to anti-theft device 10 for an attractive display to prospective customers, as depicted in FIGS. 1A and 1B.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device adaptable for selectively securing a first article of merchandise or a second article of merchandise, comprising:
    a support surface configured to support the first or the second article of merchandise thereon;
    a recess disposed within the support surface, the recess having an internal shape configured to mate with a first charger associated with the first article of merchandise, wherein the first charger is configured to supply power to the first article of merchandise when the first article of merchandise is positioned on the support surface of the anti-theft device;
    an insert having a first surface sized for insertion into the recess and a second surface configured to mate with a second charger associated with the second article of merchandise, wherein the second charger is configured to supply power to the second article of merchandise when the second article of merchandise is positioned on the support surface of the anti-theft device; and
    wherein the anti-theft device is configured to be selectively adapted for securing the first article of merchandise when the insert is excluded from the recess or securing the second article of merchandise when the insert is disposed within the recess.

2. The anti-theft device of claim 1, wherein the insert comprises a cavity configured to receive the second charger therein.

3. The anti-theft device of claim 1, wherein the second charger is an inductive charger configured to wirelessly supply power to the second article of merchandise.

4. The anti-theft device of claim 1, wherein the recess has a first aperture configured to provide passage for an electric cable coupled to the first or the second charger.

5. The anti-theft device of claim 4, wherein the recess has a second aperture configured to provide access to an interior space of the recess for removal of the insert from the recess.

6. The anti-theft device of claim 4, wherein the insert has a notch configured to be at least partially aligned with the first aperture of the recess thereby enabling passage of the electric cable therethrough.

7. The anti-theft device of claim 1, further comprising a security clip configured to attach to the first or the second article of merchandise.

8. The anti-theft device of claim 7, wherein the security clip is electrically coupled to an alarm circuitry via an electric conductor, the alarm circuitry being configured to detect disengagement of the clip from the first or the second article of merchandise or severance of the electric conductor.

9. The anti-theft device of claim 7, wherein the support surface is disposed on a shelf, and wherein the security clip is configured to couple to the shelf thereby creating a first point of engagement, and wherein the first or the second charger is configured to couple to the first or the second article of merchandise thereby creating a second point of engagement, wherein the first and the second points of engagement maintain the first or the second article of merchandise aligned relative to the anti-theft device.

10. The anti-theft device of claim 1, wherein the anti-theft device comprises a stand having a hollow channel configured to receive an electric cable supplying power to the first or the second charger.

11. The anti-theft device of claim 1, wherein the second surface of the insert is configured to be substantially flush with the support surface when the insert is disposed within the recess.

12. A method of securing an article of merchandise using an anti-theft device, comprising:
    affixing the anti-theft device to a support surface, wherein the anti-theft device is configured to support the article of merchandise thereon, and wherein the anti-theft device has a recess disposed therein;
    responsive to a charger associated with the article of merchandise being sized for a mating engagement with the recess, inserting the charger directly into the recess, or responsive to the charger not being sized for a mating engagement with the recess, selecting an insert having a first surface configured for mating engagement with the recess and a second surface configured for mating engagement with the charger and disposing the insert within the recess and placing the charger onto the second surface of the insert; and
    placing the article of merchandise on the support surface such that a back surface of the article of merchandise is positioned over the charger, wherein the charger is configured to supply power to the article of merchandise when the article of merchandise is positioned on the support surface of the anti-theft device.

13. The method of claim 12, wherein the step of placing the charger onto the second surface of the insert comprises placing the charger into a cavity within the insert configured to receive the charger therein.

14. The method of claim 12, wherein the charger is an inductive charger configured to wirelessly supply power to the article of merchandise.

15. The method of claim 12, further comprising a step of routing an electric cable through a first aperture disposed within the recess and connecting the electric cable to the charger.

16. The method of claim 15, further comprising a step of at least partially aligning a notch disposed within the insert with the first aperture of the recess thereby enabling passage of the electric cable therethrough.

17. The method of claim 12, further comprising a step of attaching a security clip to the article of merchandise.

18. The method of claim 17, wherein the security clip is electrically coupled to an alarm circuitry via an electric conductor, the alarm circuitry being configured to detect disengagement of the security clip from the article of merchandise or severance of the electric conductor.

19. The method of claim 18, further comprising a step of coupling the security clip to a platform connected to the support surface thereby creating a first point of engagement, and coupling the article of merchandise to the charger thereby creating a second point of engagement, whereby the first and the second points of engagement maintain the article of merchandise aligned relative to the anti-theft device.

20. The method of claim 12, further comprising a step of routing the electric cable through a hollow channel disposed within a stand of the anti-theft device, wherein the support surface is disposed on a shelf connected to the stand.

* * * * *